Jan. 19, 1960  L. L. WEISGLASS ET AL  2,921,499
AUTOMATIC DODGING DEVICE FOR PHOTOGRAPHY
Filed March 7, 1958
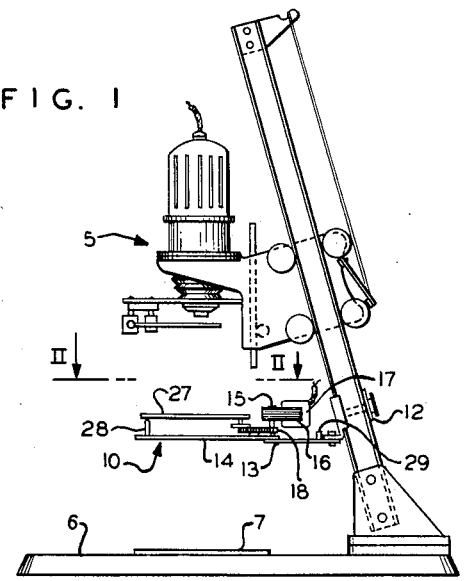
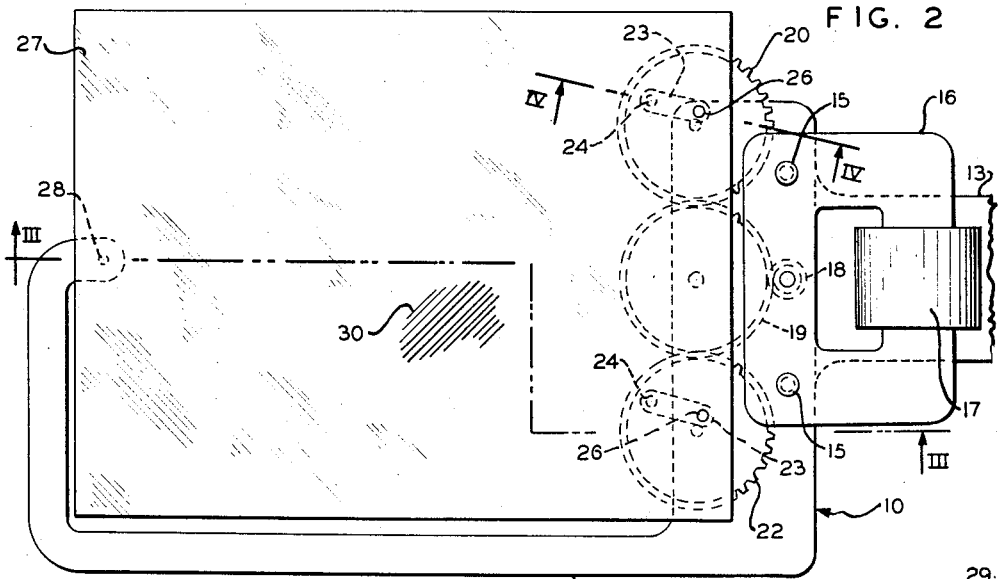
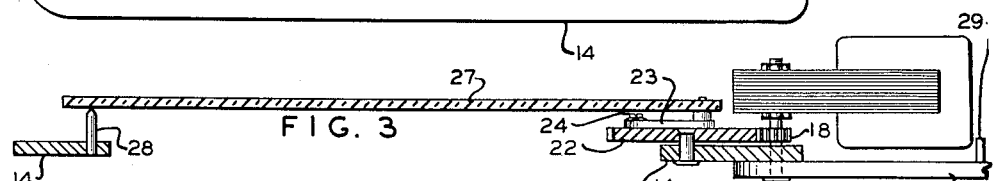
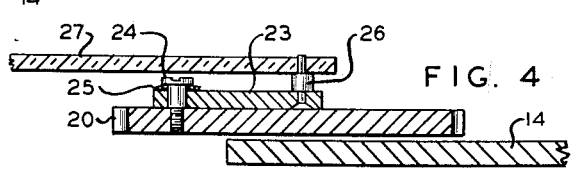
INVENTORS
ALFRED SIMMON
LOUIS L. WEISGLASS
BY
ATTORNEY

United States Patent Office 2,921,499
Patented Jan. 19, 1960

2,921,499

AUTOMATIC DODGING DEVICE FOR PHOTOGRAPHY

Louis L. Weisglass, New York, and Alfred Simmon, Garden City, N.Y., assignors to Simmon Brothers, Inc., Long Island City, N.Y., a corporation of New York Application March 7, 1958, Serial No. 719,771

6 Claims. (Cl. 88—24)

The present invention relates to a photographic dodging device particularly adaptable for use in connection with photographic printing of either black and white or color prints.

The technique of dodging has long been known in the art of photography but heretofore has been more or less restricted to the making of black and white prints from film negatives. The purpose of dodging is to correct during printing for certain faults existing on the film negative from which the print is being made such for example as the density at certain localized areas. It frequently happens that at such areas the density may be either too great or insufficient and hence it is highly desirable to rectify this condition during printing. This is usually done by the use of a small opaque member supported at the end of a small wire or rod and which is fanned or oscillated by the operator in the light beam between the film negative and the sensitized printing paper so as to cast a varying shadow over the desired area where the density is to be altered, with the result that the total accumulated light actually striking the sensitized printing paper is controlled within certain limits. In the making of black and white prints it is relatively simple to confine the dodging to the desired area of the print because the operator can follow the oscillating shadow with his eye since the image from the negative is readily seen in the dark room on the sensitized paper during the printing.

The technique of dodging is of even more importance in color photography, and especially the printing of pictures which is known as the tri-color technique, because it is not only just as desirable to correct for density defects in the film negative but equally imperative to correct for color deficiencies during the printing. However, the problem of dodging when making color prints has heretofore been an extremely difficult one because of the fact that since three filters of very deep color separation are used very little of the image can be seen on the sensitized paper during printing and hence an operator cannot follow any oscillating shadow and thus confine the dodging to the desired area.

It is accordingly the primary object of the present invention to provide an automatically operable dodging device for use in both black and white and colored photographic printing and wherein the desired area for such dodging can be accurately preselected.

Another object of the present invention is the provision of an automatically operable dodging device equally adaptable to both black and white and tri-colored photographic printing and which corrects not only for density deficiencies in printing but when employed for the making of tri-color photographic prints it can also be preset to correct for color deficiencies of any one or more of the three colors.

A further object of the present invention is the provision of an automatically operable dodging device equally adaptable to both black and white and tri-color photographic printing and which is of simple and economical construction yet accurate and efficient in its operation.

Still further objects of the present invention will become obvious to those skilled in the art by reference to the accompanying drawing wherein:

Figure 1 is a side elevational view of a photographic printing assembly to which the dodging device of the present invention is attached, Fig. 2 is a top plan view of the dodging device of the present invention taken on the line II—II of Fig. 1 but on a somewhat larger scale, Fig. 3 is a sectional view taken on the line III—III of Fig. 2 and looking in the direction shown by the arrows, and Fig. 4 is a sectional view taken on the line IV—IV of Fig. 2 and looking in the direction shown by the arrows but on a slightly enlarged scale.

Referring now to the drawing more in detail, as illustrative of one form which the present invention may take, a photographic enlarger is shown in Fig. 1 which is of a type well known in the art and since it per se forms no part of the present invention it need not be described in detail. Suffice it to say that it carries a movable projector 5 comprising an assembly of a lamp, condenser, film-negative support, and filter changer; and a base 6 on which the usual sensitized paper 7 rests during the making of a photographic print.

The dodging device 10 of the present invention comprises a clamp member or the like 12 movable longitudinally of the enlarger support column so as to preferably dispose the dodging device 10 approximately midway between the projector lens and the sensitized paper 7. A bracket 13 is pivotally connected to the clamp member 12 and such bracket 13 carries a substantially C-shaped frame 14 and a small electric motor bolted or riveted thereto at 15. This electric motor comprises the usual magnetizable core 16 and field winding 17 which is connectable to the usual source of electrical energy along with the incandescent lamp within the projector 5. The armature of this electric motor carries a pinion gear 18 meshing with a drive gear 19 journalled to the frame 14 and this latter gear in turn meshes with two further gears 20 and 22 also journalled to the frame 14, with the axes of all three gears 19, 20, and 22, being in a common horizontal plane as can be seen from Fig. 2, so that rotation of the drive gear 19 by the motor causes simultaneous rotation of the gears 20 and 22 in the same direction but opposite to that of the drive gear 19.

A lever 23 is pivoted to each of the gears 20 and 22 adjacent the periphery thereof by means of a shoulder screw 24 and a spring-tension washer 25, as best seen in Fig. 4, so that each of said levers 23 can be adjusted to any desired tangential position and yet are free to rotate about the shoulder screw 24 as a pivot. The length of these levers 23 is approximately equal to the radius of the gears 20 and 23 and at their respective free ends each are provided with an upstanding stud 26 secured thereto. It can thus be seen that if the levers 23 are adjusted by the shoulder screw 24 so that the axis of the gear to which it is secured aligns with the axis of the upstanding stud 26, then the length of the lever between the axis of the stud 26 and the pivot point at the shoulder screw 24 is substantially equal to the radius of the gears 20 and 22. Thus upon rotation of these gears 20 and 22, the levers 23 will rotate therewith and the upstanding stud 26 then being in alignment with the axis of the respective gear to which its associated lever is attached, likewise will perform rotary movement about such axis.

When, however, the levers 23 are adjusted by the shoulder screw 24 so as to dispose the axis of the upstanding stud 26 at some point on an arc passing through the axis of the gear with which such lever is associated, then upon rotation of the gear the stud 26 performs excentric movement relative to such gear. Accordingly by adjusting each of the levers 23 to the same excentricity relative to their respective associated gears a parallelogram is thus formed between the shoulder screw pivot 24 and stud of one lever, with respect to these same points on the other lever. Also, the farther the respective studs 26 are adjusted along the arc from the axis of rotation of the gear which carries its associated lever, the greater will be the excentric movement of the parallelogram.

The dodging device of the present invention includes a relatively large highly transparent plate 27 of glass or transparent plastic material such as that sold under the trade-mark "Lucite" substantially free of all optical imperfections so that the light beam from the projector 5 will pass freely therethrough to the sensitized paper 7. Such plate 27 is provided with holes which are engaged by the upstanding studs 26 on the ends of the respective levers 23 which thus supports one end of this transparent plate as well as causing oscillatory movement thereof while the other end of such plate 27 rests on a support bearing 28 projecting upwardly from the outer end of the C-shaped frame 14. The entire dodging device is rotatable about its pivotal connection between the clamp member 12 and bracket 13, so as to position it completely out of the photographic printing field whenever desired and such device is just as readily again movable into said field and proper alignment even in the dark, since this is assured by a stop member or detent 29 (Figs. 1 and 3) carried by the bracket 13 and which aligns with a slot or indentation in the clamp member 12.

When it is desired to correct either density deficiencies or slightly alter the color printing of any desired area, the operator merely moves the dodging device into the light beam from the projector with the negative film in its holder and allows unfiltered light to pass therethrough which accordingly produces a clear bright uncolored image on the paper. The operator then draws parallel lines 30 on the upper surface of the transparent plate 27 with a grease pencil at the proper location to produce the desired density by reducing the transparency of the plate at such point and as determined by the shadow cast on the bright image at the area of the latter where the density or color correction is to be made, and of course such markings 30 are made on the plate 27 while it is at rest. Once the corrected area is thus determined the operator then needs only to energize the electric motor which through the parallelogram drive causes oscillatory movement of the transparent plate 27 with its shaded portion 30 directly over the area of the sensitized paper where correction is to be made during printing. If the print is a black and white then correction will thus be made for density deficiencies. On the other hand, if the print being made is tri-color and density correction only is desired, then the oscillating dodging device remains in the light beam during the entire time of making the print on the sensitized paper 7 which thus includes all the various colored light falling on the paper. However, when color correction is desired, as distinguished from density, at the selected area, then the oscillating dodging device is left in the light beam between the film-negative and the sensitized paper 7 only during the period when the filter of the particular color for which correction is to be made is also interposed in the light beam by the filter changer of the projector 5, and during the time the sensitized paper is subjected to color by the introduction of other colored filters into the light beam, the dodging device is rotated about its pivotal connection with the clamp member 12, out of the field of the light beam. Once a given print has been completed the markings 30 made by the grease pencil can be readily removed by wiping with a cloth or the like preparatory to the making of new prints of a different image.

It should thus become obvious to those skilled in the art that an automatically operable dodging device has been herein provided which is employed for the accurate correction of density deficiencies during the making of photographic prints. Moreover such dodging device is also automatically operable with equal accuracy and fidelity to correct for color deficiencies during the making of colored photographic prints.

Although one specific embodiment of the present invention has been herein shown and described, it is to be understood that still further modifications thereof may be made without departing from the spirit and scope of the invention as set forth in the appended claims.

We claim:

1. An automatically operable dodging device for the making of both black and white or colored photographic prints on sensitized paper comprising an optically clear transparent plate adapted to be disposed in the light beam between a photographic projector and the sensitized paper to be printed, removable markings applied to the surface of said plate for reducing the transparency thereof over an area corresponding to an area of the image on the sensitized paper which it is desired to correct for density or color, and drive means for said transparent plate and operable during the making of a photographic print to automatically cause oscillatory movement of said plate along with its removable markings to give a density or color correction to the photographic image during the printing thereof.

2. An automatically operable dodging device for the making of both black and white or colored photographic prints on sensitized paper comprising an optically clear transparent plate adapted to be disposed in the light beam between a photographic projector and the sensitized paper to be printed, removable markings applied to the surface of said plate for reducing the transparency thereof over an area corresponding to an area of the image on the sensitized paper which it is desired to correct for density or color, and electrically operable means for driving said transparent plate and operable during the making of a photographic print to automatically cause oscillatory movement of said plate along with its removable markings to give a density or color correction to the photographic image during the printing thereof.

3. An automatically operable dodging device for the making of both black and white or colored photographic prints on sensitized paper comprising a transparent member positionable in the light beam between a photographic projector and the sensitized paper to be printed, said member comprising an optically clear plate having one end connected to one end of a pair of spaced levers and which levers have their other ends connected adjacent the periphery of a pair of gears to form substantially a parallellogram, removable markings applied to the surface of said plate for reducing the transparency thereof over an area corresponding to an area of the image on the sensitized paper which it is desired to correct for density or color, a drive gear operable upon rotation thereof to cause rotation of both said lever carrying gears in the same direction accompanied by automatic movement of the parallelogram and oscillatory movement of said plate along with its removable markings during the making of a photographic image during the printing thereof, and an electric motor for operating said drive gear.

4. An automatically operable dodging device for the making of both black and white or colored photographic prints on sensitized paper comprising a transparent member pivotally movable at will into and out of the light beam between a photographic projector and the sensitized paper to be printed, said member comprising an optically clear plate having one end connected to one end of a pair of spaced levers and which levers have their other ends connected adjacent the periphery of a pair of gears to form substantially a parallelogram, removable markings applied to the surface of said plate for reducing the transparency thereof over an area corresponding to an area of the image on the sensitized paper which it is desired to correct for density or color, a drive gear operable upon rotation thereof to cause rotation of both said lever carrying gears in the same direction accompanied by automatic movement of the parallelogram and oscillatory movement of said plate along with its removable markings during the making of a photographic print to give a density or color correction to the photographic image during the printing thereof, and an electric motor for operating said drive gear.

5. An automatically operable dodging device for the making of both black and white or colored photographic prints on sensitized paper comprising an optically clear transparent plate adapted to be disposed in the light beam between a photographhic projector and the sensitized paper to be printed, means applied to said plate for reducing the transparency thereof over an area corresponding to an area of the image on the sensitized paper which it is desired to correct for density or color, drive means including a prime mover and a coupling arrangement connected to said transparent plate and operable during the making of a photographic print to automatically cause oscillatory movement of said plate along with its transparency reducing means to give a density or color correction to the photographic image during the printing thereof, and adjustable means forming a part of said drive means and operable to adjust the radius of oscillatory movement of said plate.

6. An automatically operable dodging device for the making of both black and white or colored photographic prints on sensitized paper comprising a transparent member positionable in the light beam between a photographic projector and the sensitized paper to be printed, said member comprising an optically clear plate having one end connected to one end of a pair of spaced levers and which levers have their other ends connected adjacent the periphery of a pair of gears to form substantially a parallelogram, said levers being adjustably movable relative to their connection adjacent the periphery of said gears to selectively adjust the radius of oscillatory movement of said plate, removable markings applied to the surface of said plate for reducing the transparency thereof over an area corresponding to an area of the image on the sensitized paper which it is desired to correct for density or color, a drive gear operable upon rotation thereof to cause rotation of both said lever carrying gears in the same direction accompanied by automatic movement of the parallelogram and oscillatory movement of said plate along with its removable markings during the making of a photographic print to give a density or color correction to the photographic image during the printing thereof, and an electric motor for operating said drive gear.

References Cited in the file of this patent

UNITED STATES PATENTS

| | | |
|---|---|---|
| 2,416,919 | Goldsmith | Mar. 4, 1947 |
| 2,422,174 | Adams | June 17, 1947 |
| 2,740,345 | Johnson | Apr. 3, 1956 |
| 2,822,729 | Capatosto | Feb. 11, 1958 |

OTHER REFERENCES

An article "Dodging and Printing-in" and an illustration in the "Complete Photographer—an Encyclopedia of Photography," volume 2, by "National Educational Alliance," pages 406 and 408, and an article "Processing Highlight Mask" in said Encyclopedia, volume 10, lines 40–46 on page 3699.